United States Patent
Tran et al.

(10) Patent No.: US 7,328,254 B2
(45) Date of Patent: Feb. 5, 2008

(54) DYNAMIC LOCATION STORAGE AND RETRIEVAL IN A WIRELESS PORTAL SERVER

(75) Inventors: Luu Tran, Santa Clara, CA (US); Sathya Kavacheri, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 766 days.

(21) Appl. No.: 10/116,388

(22) Filed: Apr. 3, 2002

(65) Prior Publication Data

US 2003/0220982 A1    Nov. 27, 2003

(51) Int. Cl.
G06F 15/16        (2006.01)
(52) U.S. Cl. .................. 709/219; 709/217; 709/230; 455/414.1; 455/456.1
(58) Field of Classification Search ............. 709/201, 709/218, 223, 224, 217, 19, 230; 455/414.1–414.4, 455/422, 422.1, 433, 456.1, 456.2–3, 408; 707/4
See application file for complete search history.

(56) References Cited

U.S. PATENT DOCUMENTS

| | | | |
|---|---|---|---|
| 6,401,085 B1* | 6/2002 | Gershman et al. ............. 707/4 |
| 6,714,791 B2* | 3/2004 | Friedman ................. 455/456.1 |
| 6,741,853 B1* | 5/2004 | Jiang et al. .................. 455/418 |
| 7,089,031 B1* | 8/2006 | Pedersen et al. ......... 455/550.1 |
| 2002/0010758 A1* | 1/2002 | Chan .......................... 709/218 |
| 2002/0016173 A1* | 2/2002 | Hunzinger et al. .......... 455/456 |
| 2002/0068585 A1* | 6/2002 | Chan et al. ................... 455/456 |
| 2002/0151313 A1* | 10/2002 | Stead .......................... 455/456 |
| 2002/0160766 A1* | 10/2002 | Portman et al. ............. 455/422 |
| 2003/0006911 A1* | 1/2003 | Smith et al. ................. 340/988 |
| 2003/0008661 A1* | 1/2003 | Joyce et al. ................. 455/456 |
| 2003/0017826 A1* | 1/2003 | Fishman et al. ............. 455/426 |
| 2003/0069940 A1* | 4/2003 | Kavacheri et al. .......... 709/217 |
| 2003/0208522 A1* | 11/2003 | McDonnell et al. ........ 709/201 |
| 2004/0203900 A1* | 10/2004 | Cedervall et al. ......... 455/456.1 |
| 2004/0203902 A1* | 10/2004 | Wilson et al. ........... 455/456.1 |
| 2004/0224662 A1* | 11/2004 | O'Neil et al. ............... 455/408 |
| 2005/0026627 A1* | 2/2005 | Boling et al. ............. 455/456.1 |

FOREIGN PATENT DOCUMENTS

EP         001119211 A2 *    7/2001
EP         001303105 A1 *    4/2003

* cited by examiner

Primary Examiner—Thu Ha Nguyen
(74) Attorney, Agent, or Firm—Osha Liang LLP

(57) ABSTRACT

Embodiments of the present invention relate to a method and mechanism for managing location information in a wireless portal environment. The method consists of acquiring the location information from a user's location-enabled wireless device which is in communication with a wireless network, storing the location information in a storage device in the wireless network, retrieving the location information from the storage device in the wireless network, and disseminating the location information to a client which is also in communication with the wireless network. A client can be any type of network presence that is enabled to provide services that are enhanced with knowledge of a user's physical location in a wireless portal environment. The location information can be geophysical information derived from global positioning system (GPS) or any other location-specific information from a suitable source.

25 Claims, 4 Drawing Sheets

DYNAMIC LOCATION STORAGE AND RETRIEVAL IN A WIRELESS PORTAL SERVER

FIELD OF THE INVENTION

Embodiments of the present invention relate to the field of methods and apparatus for communicating user location using computing devices in a wireless network.

BACKGROUND OF THE INVENTION

The Internet has revolutionized the way people seek and acquire information. Sources of information continue to multiply, presenting enormous volumes of information; enough to overwhelm even highly sophisticated users. The portal server has emerged to aid the user in selecting, organizing and presenting information useful to, and desired by, the user.

Rapidly developing wireless access to the Internet provides an additional challenge to portal servers in that the portable devices that enable wireless access have unique needs in the way information is presented to their users. The wireless portal server similarly requires features not required in the wired environment.

A significant difference between the wired and wireless environments is the movement of users. In a wired environment, a user's location generally remains constant both during an access session and between sessions. In the wireless arena, due to the portable nature of wireless devices, a user's location can easily change between sessions and often does so during a session. The changing location puts another demand on a portal server if it is furnishing information and services from clients that are location dependent.

A need exists, therefore, for a method for acquiring the location of a wireless portal user and of storing the location information in or by the wireless portal server. Such a method should also provide the location information to appropriate clients of the portal server, e.g., those sources of information and services that could better serve the user with accurate and timely knowledge of the user's location.

SUMMARY OF THE INVENTION

Embodiments of the present invention allow the acquiring of the location of a wireless portal user and of storing the location information in or by the wireless portal server. The present invention also provides a method for clients of the portal server to obtain the location of the wireless portal user.

Embodiments of the present invention relate to a method and mechanism for managing location information in a wireless portal environment. The method consists of acquiring the location information from a user's location-enabled wireless device which is in communication with a wireless network, storing the location information in a storage device in the wireless network, retrieving the location information from the storage device in the wireless network, and disseminating the location information to a client which is also in communication with the wireless network. A client can be any type of network presence that is enabled to provide services that are enhanced with knowledge of a user's physical location in a wireless portal environment. The location information can be geophysical information derived from global positioning system (GPS) or any other location-specific information from a suitable source.

In one embodiment, the process can call a Java interface like "Give Me Location ()" and the underlying processes used for the retrieval of the information are transparent to the process, e.g., whether or not GPS is used, etc. The location service, in this embodiment, has the intelligence to determine the desired location.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent in reference to the Figures.

Figure 1:
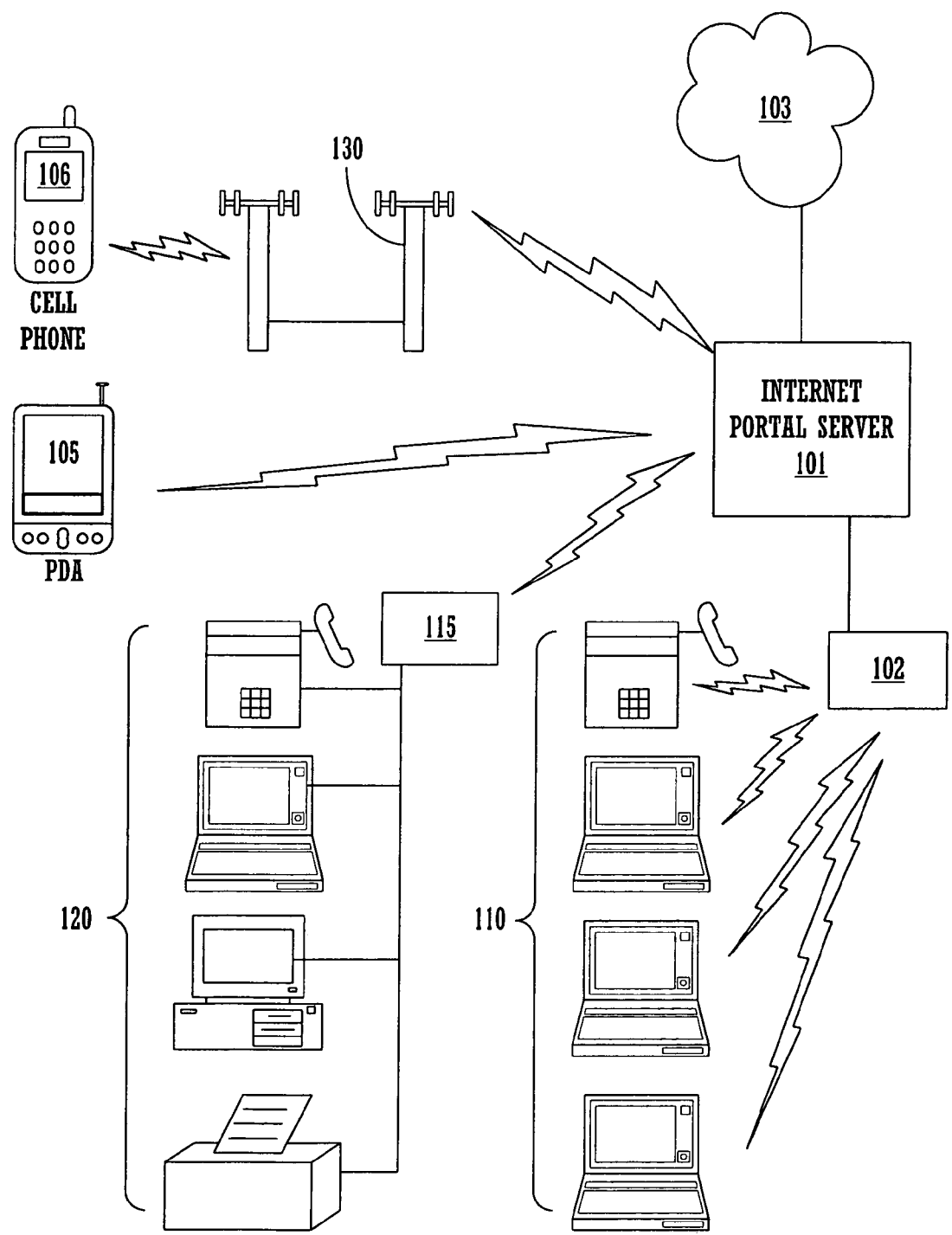
FIG. 1 illustrates a wireless computer network in accordance with one embodiment of the present invention.

FIG. 1 shows an Internet portal server 101 that serves wireless LAN (local area network) 110 through hub 102. Network server 101 also wirelessly serves wired LAN 120 through wireless transceiver 115. Server 101 is connected to and communicates with the Internet, 103 as well as wireless communication devices illustrated by PDA (personal data assistant) 105 and web-enabled cellular phone 106. Communication with cellular phone 106 can be either directly in some implementations or through the Internet via Internet-connected cellular system 130. Both cellular phone 106 and PDA 105 are, in this embodiment, enabled under the wireless access protocol (WAP), however, any wireless protocol could be used. In that protocol, devices so enabled are able to communicate with the Internet much like computers.

Figure 2:
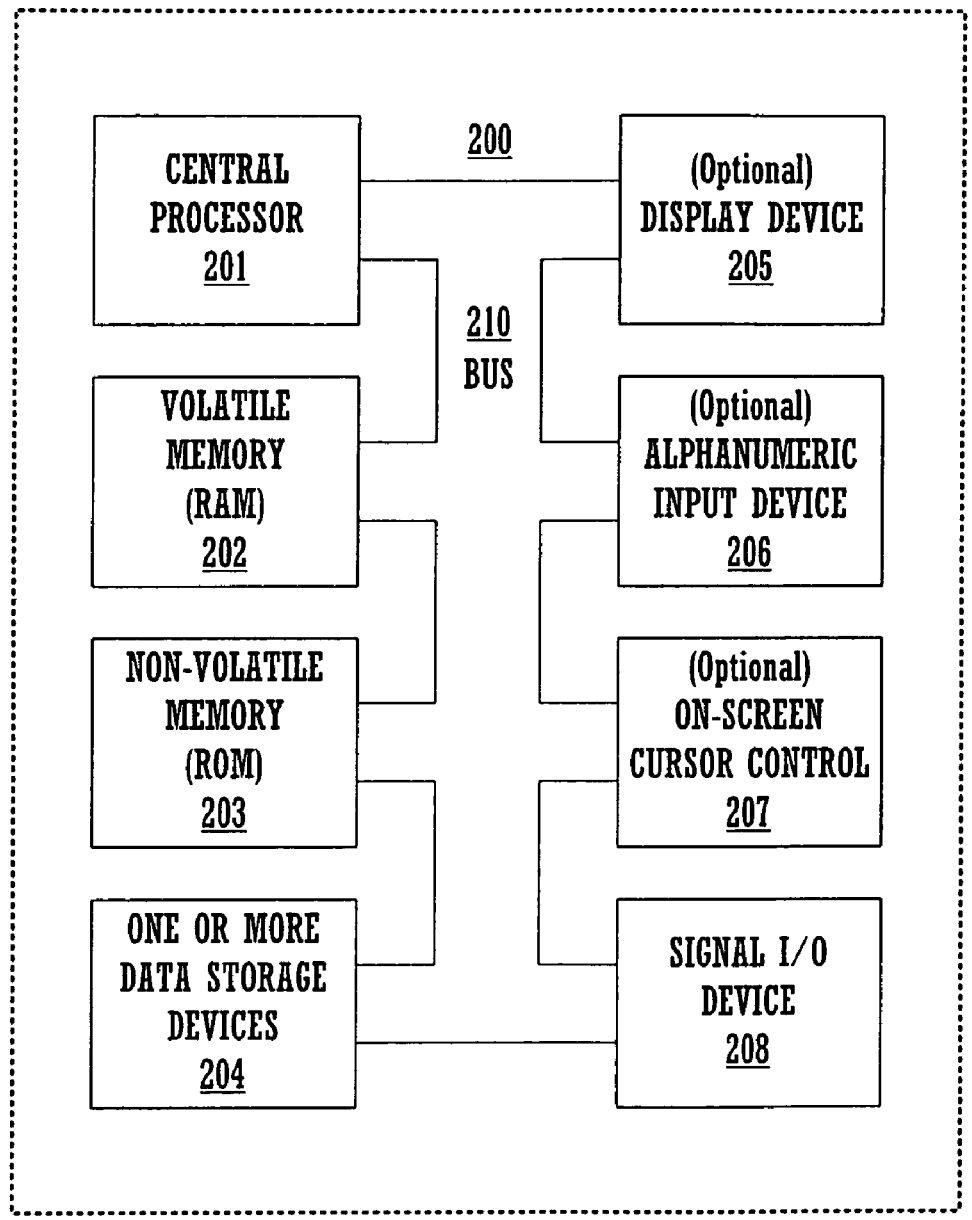
FIG. 2 illustrates an exemplary computer in accordance with one embodiment of the present invention.

FIG. 2 illustrates an exemplary computer system 200 which may act as the portal server system. In FIG. 2, computer system 200 includes bus 210 which connects processor 201, volatile RAM 202, non-volatile ROM 203 and one or more data storage devices 204. Also connected to the bus can be optional display device 205, optional alphanumeric input device 206, and optional cursor control 207. Signal I/O device 208 allows for communication with other devices such as the web-enabled cellular phone 106 and PDA 105 shown in FIG. 1. Wireless communication with wireless devices can be implemented through a serial connection, infrared or RF links and any of these can, in some embodiments, be used as the link for network communication. In wireless access enabled telephones, PDAs or other wireless devices, the appropriate communications are also enabled. In the present embodiment, signal I/O device 208 includes an Internet interface module for coupling computer 200 to the Internet and appropriate interface modules for coupling to wireless devices such as 105 and 106 of FIG. 1.

It should be noted that in the present embodiment, server 101 is an Internet portal server that includes some or all of the elements of exemplary computer 200 of FIG. 2. Server 101 provides access to a network and to the Internet for the devices it serves. Some of the served devices in this embodiment include wireless access devices. By providing a doorway into the Internet for wireless devices, server 101 is a wireless Internet portal server. Wireless portal services, such as the location service in this embodiment, may reside in a portal server such as server 101 or in some other physical device in communication in the Internet.

Figure 3:
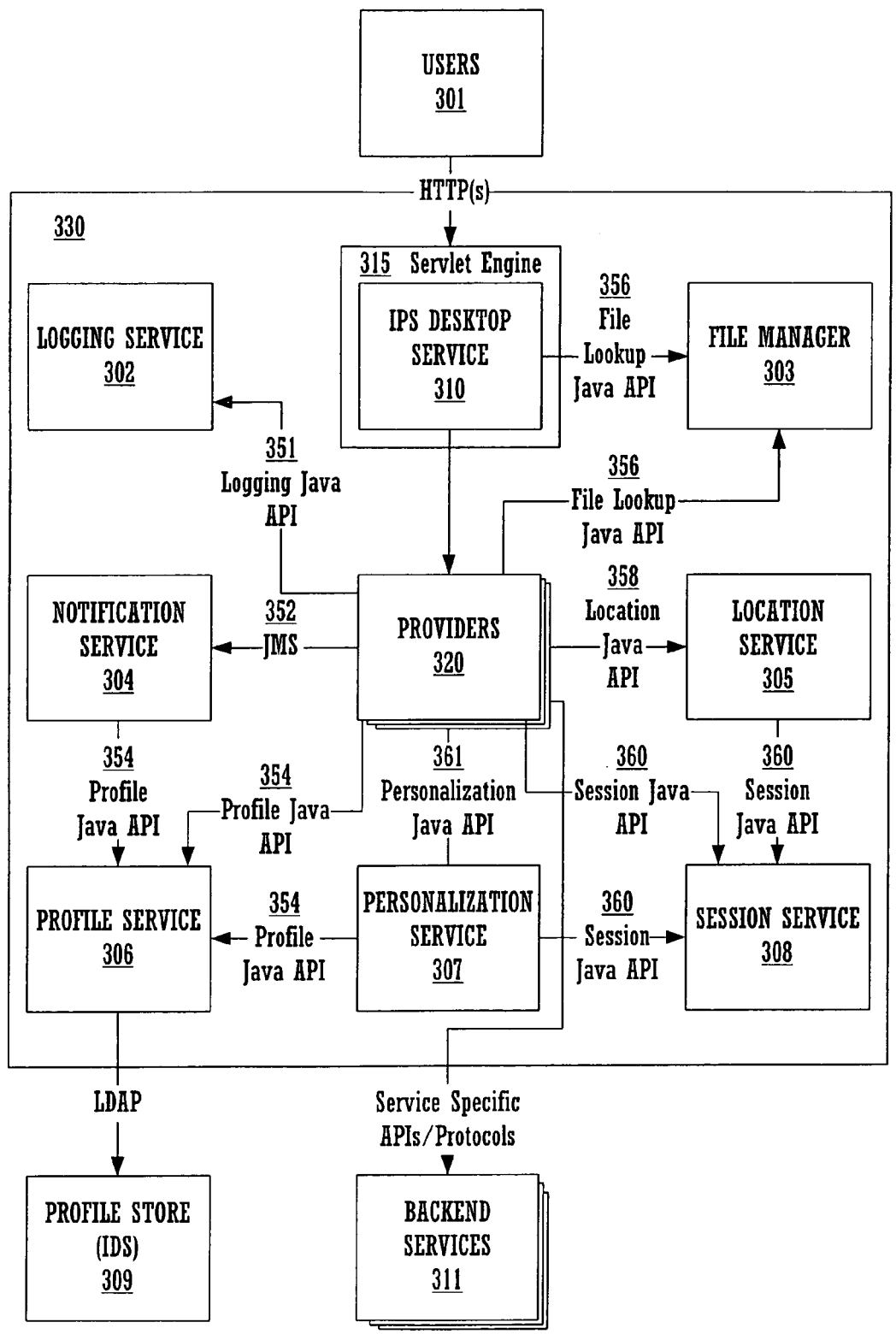
FIG. 3 illustrates a block diagram representation of a wireless portal environment in accordance with one embodiment of the present invention.

FIG. 3 shows a wireless portal environment, 330, that includes location service 305 for acquiring and storing a user's location information. There, providers 320, those Internet entities that provide the dynamic content that users seek when using the Internet, access services within the wireless portal server to effectively present that content to wireless users. Wireless portal environment 330 also includes logging service 302 which communicates with the provider 320 via a logging API (application programming interface) 351. In this embodiment of the present invention, logging API 351 is implemented as a Java API; however, logging API 351 can be implemented in many different physical platforms within a network.

The Internet portal server provides a Wireless Application Environment (WAE) which specifies an environment that allows operators and service providers to build applications and services that can reach a wide variety of different platforms. WAE is part of the Wireless Application Protocol. The WAE specifies a number of requirements. This embodiment serves as a means of communication between users and providers of services useful to wireless users within the WAE.

Though logging service 302, notification service 304, IPS profiles service 306, Desktop Service 310, IPS session service 308, IPS file manager 303 and location service 305 are shown as separate functional blocks within the WAE, individual services may actually be integrated with other services.

As discussed above, each service communicates with a provider in accordance with the needs that develop in providing information and services to the user. Every user differs in the type of device used to access a wireless network, in the personalized way in which the user prefers to receive information, in the information the user is looking for in any given access session, and in the services the user wants to have made available. Each provider responds by complying with the users' preferences which are stored and can be changed as required by the user.

Each provider, 320, is given the particular needs of a user's access device and preferred services from profile service 306. The user's desktop preferences, what items the user wants displayed at any given time, are supplied from the desktop service 310. The user's desired information sought, which can change from session to session, is located in session service 308. Each service is available to the provider via an API which is peculiar to the service.

User location knowledge is provided to service providers 320 by a location service, 305, as in this discussion of this embodiment of the present invention. Location service 305 acquires user location information and stores it in anticipation of a query by a provider. Sessions service 308 in FIG. 3 is used to store the location information and storage is accomplished in a storage medium such as data storage device 204 in FIG. 2. In the embodiment shown in FIG. 1, user location information is acquired from a user device such as PDA as illustrated at 105 or a web-enabled cellular phone as illustrated at 106 or any other wireless access device. In order to provide location information, the device must be equipped with a means for determining location, such as a global positioning system receiver or, in the case of the cell phone, cellular triangulation within a cellular system. Any other location determining system can also be used.

Note that, as used here, cellular triangulation refers to a method of locating a cellular phone user by determining what cell site the phone is currently using. By reference to adjacent cell sites which can passively acknowledge a user's phone, a location of the phone can be determined. This method is only mentioned here to indicate that any method of location determination can be used in this embodiment. It is the location information, not its form of acquisition, that is in discussion here.

Figure 4:
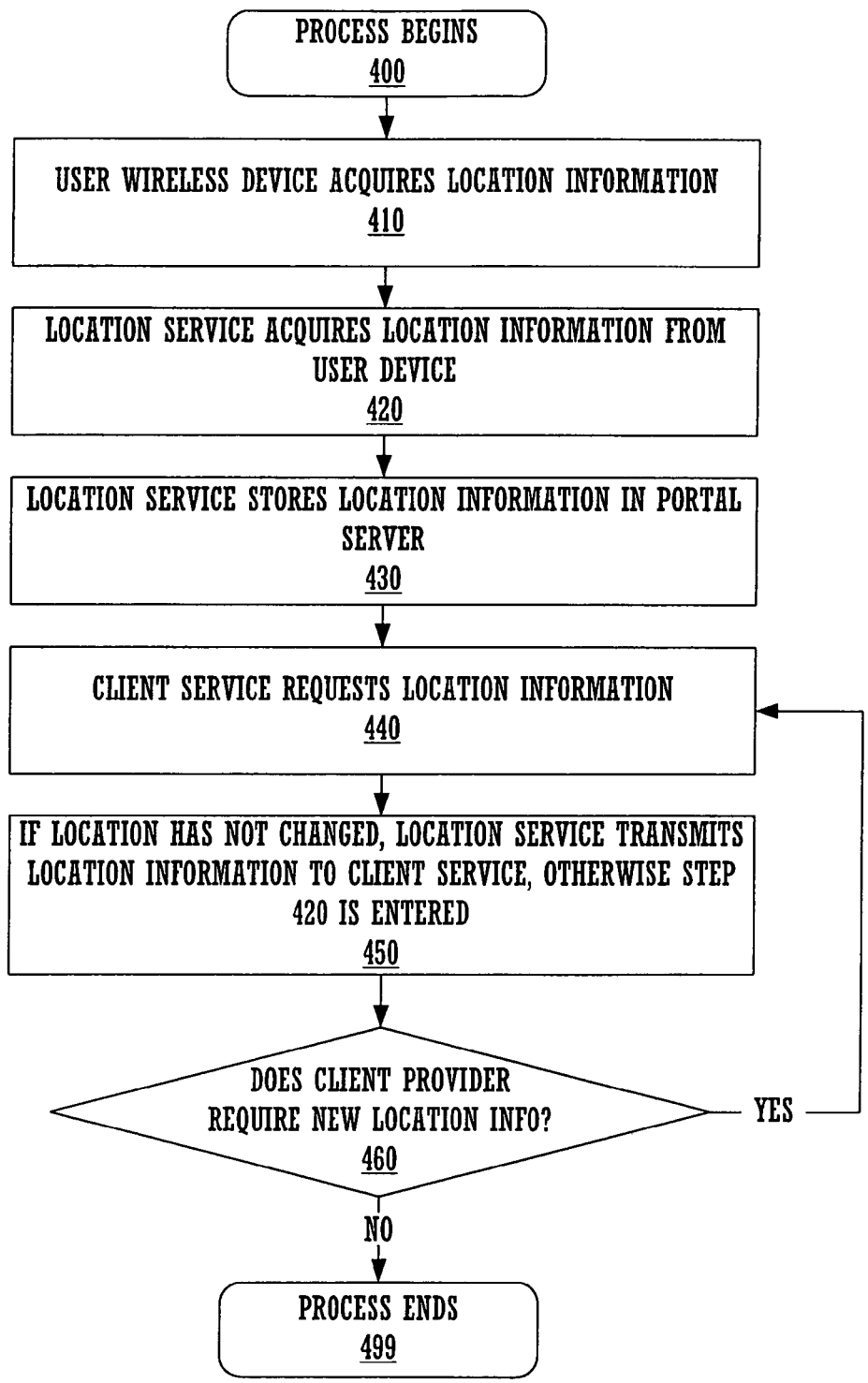
FIG. 4 is a flow chart that illustrates a method for acquiring, storing and retrieving the location of a wireless portal user in accordance with one embodiment of the present invention.

FIG. 4 is a flow diagram illustrating an operation in accordance with this embodiment of the present invention. When process 400 begins, the user's wireless access device, be it laptop computer, web-enabled wireless telephone, wireless access PDA or any other wireless, portable device, etc., determines the device's current location, 410. The location service, 305 in FIG. 3, then acquires the location information, 420, and stores it in an appropriate storage medium in a portal server, such as 101 in FIG. 1, at 430. When a client provider, 320 in FIG. 3, requests the location information, 440, the location service supplies the information to the client provider, 450. If the client provider needs new location information, 460, a request is again sent, 440. If not, the process stops at 499.

In the present embodiment, a portal server is a service, usually resident in a network server as at 101 in FIG. 1. A portal service finds information that the user selects and presents it in a way suitable to the user and the user's device. The wireless portal server does these things through wireless communication with wireless access devices and presents information unique to the wireless user.

The embodiment of the present invention discussed here, a location retrieval and storage service, uses application programming interfaces (API) that run in a wireless portal server. Generally the physical implementation of a wireless portal server includes some or all of the elements of the exemplary computer 200 illustrated in FIG. 2.

In embodiments of the present invention, some providers 320 provide location-based or location-enhanced services. One exemplary provider provides an online mapping service that utilizes knowledge of the user's location. If the user is driving from one city to another, maps of the inter-city routes are more meaningful to the user when the user is starting out and can be presented on the user's laptop computer or PDA such as 106 in FIG. 1. When the user approaches the destination, detailed city street information becomes more useful than open road information. This mapping example is well established in the art of real-time global positioning system display systems but such a service is greatly enhanced by a real-time knowledge of the user's location.

It is noted here that the specific user device determines the way information, such as mapping, is presented and the needs of the user device and preferences of the user are accounted for in the presentation. However, the acquiring and storage of location information is independent of platforms and would be transparent to the user.

A provider of location-based services isn't limited to mapping. If the same inter-city travelling user as in the example above discovers that his or her car is low on fuel, a provider can immediately provide directions to the nearest gas stations and could even provide fuel price comparisons for a group of stations. A gas station could even provide an electronic coupon, delivered to the user in real time, to encourage the user's patronage.

Another example of location-enabled or location-enhanced service that can be provided with the location service in this embodiment is a store sale coupon. If a user is walking down a street and nears a store subscribing to a providing service, when the users location is noted to be near the store, the user could be notified of a special sale on store merchandise and perhaps even deliver an electronic coupon to the user. Note that other, related, portal services can maintain a profile of user preferences and focus on those stores with merchandise most of use to the user. The same sorts of location related scenarios could apply to any number of situations. The common thread would be a providers' knowledge of the user's location.

Once location information is acquired as at 410 in FIG. 4, it is held by the user's access device, such as 105 or 106 in FIG. 1, until it is queried by the location service, at 420, in the wireless portal server, 101, or other location. The portal queries the user's wireless access device when prompted by location service, 305, then the location information is stored by the location service. Then, when the provider queries the location service as at 440 in FIG. 4, the location information is sent to it, 450 in FIG. 4. Each of these transactions involving location information is performed through a location API, 358 in FIG. 3. Alternatively, step 450 is entered only if the location has not changed. In this case, if the location information is changed, then the process traverses from step 440 back to step 420.

The location API is, in this embodiment, written in Java. This allows the transmittal of location information to be transparent to and independent of the hardware platform involved at any of the applicable servers and at the user's wireless access device.

The location service is, in this embodiment, coordinated with information that is acquired from profile service 306, personalization service 307, and session service 308. Profile service 306, via profile API 353, supplies the information peculiar to the user's access device such as display size and bandwidth capability. Personalization service 307 supplies a wide range of user-peculiar items. The user's name and various identity numbers, the user's preferences in a wide array of consumer selections can all be supplied by the personalization service. In the gasoline example discussed earlier, the user's preference of gas brand name could be supplied to the service provider by the personalization service. Profile service 306 and personalization service 307 communicate with each other and with providers via a profile API.

Profile service 306 acquires its profile information from profile store 309 through the use of an LDAP (Lightweight Directory Access Protocol) API. LDAP provides a simple protocol that allows the access and search of directories containing information which is often stored on a variety of incompatible systems.

Session service 308 communicates with both personalization service 307 and location service 308 via a session API, 360. The session service acquires and stores the information peculiar to session at hand, such as what information the user wants to receive during the session. Session information is dynamic, subject to change between sessions. The location service communicates with the session service via the session API in that the session service is the device by which location information is stored while awaiting delivery to the requesting provider.

The embodiment of the present invention discussed here provides a means by which designers and providers of portal servers in a wireless environment can seamlessly and transparently acquire and manage location information. A wireless environment has all the functionality and operational considerations of any network environment and also includes wireless access in a portion of a network's structure.

It must be remembered that each of the services and the APIs that communicate between them do not define data or data structures. They are tools for use by providers to use to build whatever portal sites that the providers choose. This embodiment of the present invention defines the interface whereby location information is acquired from a user device, stored, and supplied to a provider of location-based or location-enhanced services. With this embodiment of the present invention, a provider of those services can build a wireless portal site that can present user-specific, location-specific, information and services in a timely manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for providing a location-enhanced service to a wireless device in a wireless network, comprising:

acquiring location information about said wireless device, wherein said acquiring is performed by said wireless device;

storing said location information within said wireless device;

transmitting a first request for said location information, from a location service within said wireless network to said wireless device;

transmitting said location information, from said wireless device to said location service, responsive to said first request;

transmitting a second request for said location information, from a client content provider within said wireless network to said location service;
transmitting said location information, from said location service to said client content provider, responsive to said second request;
repeating said first request when said client content provider requires new location information about said wireless device; and
coordinating said location information with information from a profile service, information from a personalization service, and information from a session service to provide said location-enhanced service to said wireless device,
wherein said information from said profile service comprises a capability of said wireless device,
wherein said information from said personalization service comprises a user preference associated with a user of said wireless device, and
wherein said information from said session service comprises information specific to an active session of said wireless device.

2. A method as described in claim 1, wherein said wireless network comprises a wireless portal environment.

3. A method as described in claim 1, wherein said location information is geographic information.

4. A method as described in claim 1, wherein said location information is derived from global positioning system information.

5. A method as described in claim 1, wherein said location information is derived from cellular telephone system information.

6. A method as described in claim 1, wherein said location information is associated with input by a user into said wireless device.

7. A method as described in claim 1, wherein said acquiring of said location information is performed transparent to a user of said wireless device.

8. A method as described in claim 1, wherein said location service is a network server.

9. A method as described in claim 1, wherein said client content provider is resident in a portal server.

10. A method as described in claim 1, wherein said transmitting of said location information is performed transparent to a user of said wireless device.

11. A system for providing a location-enhanced service to a user device in a wireless network, comprising:
said user device, communicatively coupled with said wireless network and configured to retrieve location information about said user device;
a client content provider communicatively coupled with said wireless network and configured to transmit a first request for said location information to a location service; and
said location service, communicatively coupled with said wireless network, with said user device, and with said client content provider, and configured to:
transmit a second request for said location information to said user device,
receive said location information from said user device, responsive to said second request,
transmit said location information to said client content provider, responsive to said first request, and
repeat said second request when said client content provider requires new location information about said wireless device,
wherein said client content provider is further configured to coordinate said location information with information from a profile service, information from a personalization service, and information from a session service to provide said location-enhanced service to said user device,
wherein said information from said profile service comprises a capability of said user device,
wherein said information from said personalization service comprises a user preference associated with a user of said user device, and
wherein said information from said session service comprises information specific to an active session of said user device.

12. A system as described in claim 11, wherein said wireless network comprises a wireless portal environment.

13. A system as described in claim 11, wherein said user device is a personal data assistant.

14. A system as described in claim 11, wherein said user device is a portable telephone.

15. A system as described in claim 11, wherein said user device is a portable computing device.

16. A system as described in claim 11, wherein said location information is geographic information.

17. A system as described in claim 11, wherein said location information is derived from global positioning system information.

18. A system as described in claim 11, wherein said location information is derived from cellular telephone system information.

19. A system as described in claim 11, wherein said client content provider is a portal server.

20. A system as described in claim 11, wherein said location service is a portal server.

21. A system as described in claim 11, wherein said second request for said location information is transmitted to said user device transparent to a user of said user device.

22. A wireless portal location service, comprising:
a network;
a wireless portal server communicatively coupled with said network and comprising a location service;
a wireless device communicatively coupled with said network and with said wireless portal server, and configured to acquire location information about said wireless device; and
a client content provider communicatively coupled with said network and with said wireless portal server and configured to transmit a first request for said location information to said location service;
wherein said location service is configured to:
transmit a second request for said location information to said wireless device,
acquire said location information from said wireless device, responsive to said second request,
transmit said location information to said client server responsive to said first request, and
repeat said second request when said client content provider requires new location information about said wireless device,
wherein said client content provider is further configured to coordinate said location information with information from a profile service, information from a personalization service, and information from a session service to provide a location-enhanced service to said wireless device, wherein said information from said profile service comprises a capability of said wireless device, wherein said information from said personalization service comprises a user preference associated with a user of said wireless device, and wherein said information from said session service comprises information specific to an active session of said wireless device.

23. A wireless portal location service as described in claim 22, wherein said location service acquires said location information from said wireless device transparent to a user of said wireless device.

24. A wireless portal location service as described in claim 22, wherein said location service stores said location information in said wireless portal server.

25. A wireless portal location service as described in claim 22, wherein said location information is related to a geophysical location of said wireless device in said network.

* * * * *